UNITED STATES PATENT OFFICE.

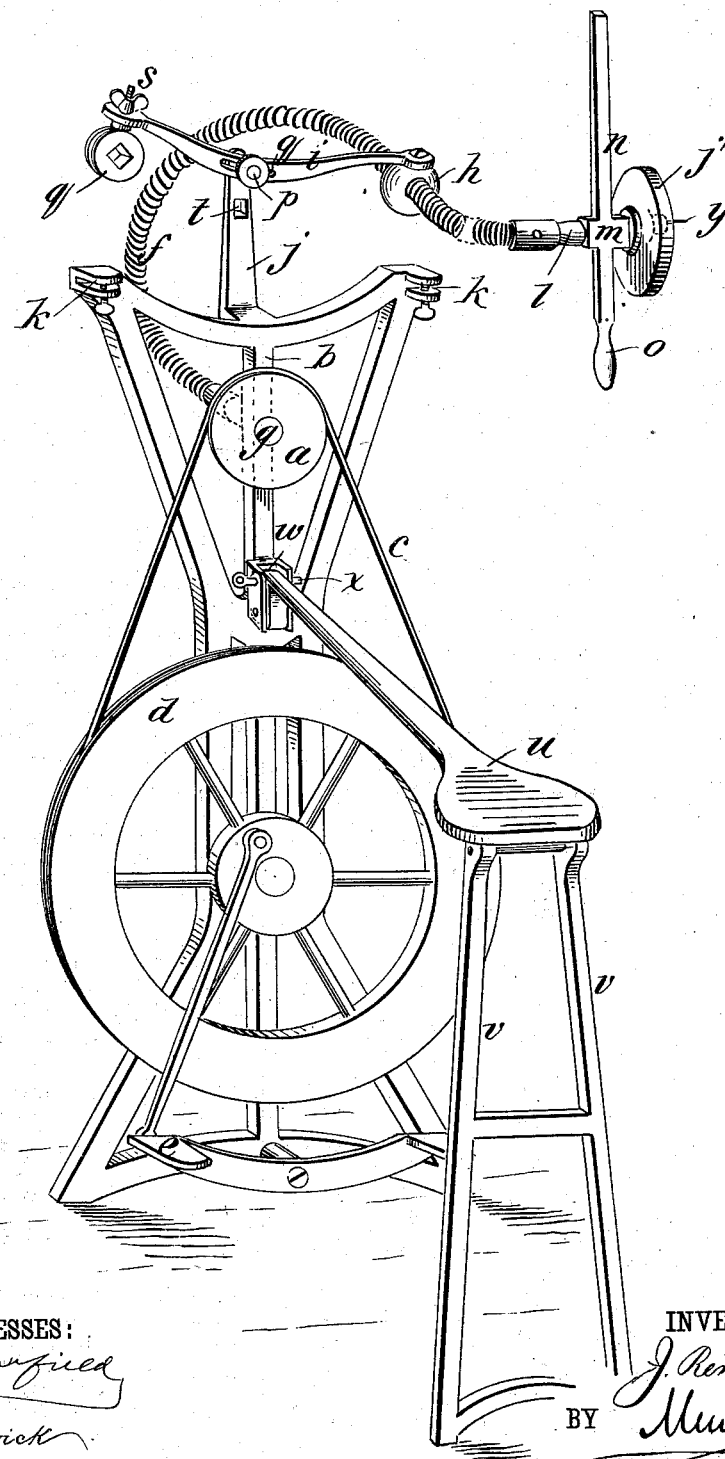

JOHN RENTZ, OF QUINCY, ILLINOIS.

GRINDING-MACHINE.

SPECIFICATION forming part of Letters Patent No. 282,225, dated July 31, 1883.

Application filed June 4, 1883. (Model.)

*To all whom it may concern:*

Be it known that I, JOHN RENTZ, of Quincy, in the county of Adams and State of Illinois, have invented a new and Improved Grinding-Machine, of which the following is a full, clear, and exact description.

My invention consists of an improved contrivance of flexible shaft-adjusting devices, holder for the grinding-wheel, and a clamp-holder for the support of a mower or reaper sickle to be ground, in combination with a foot-power or other driving-gear, making a simple and efficient machine, whereby light grinding can be done to advantage with a small stone or emery-wheel, and the wheel-arbor has a socket for inserting a boring or carving tool, which may also be worked by the same means, all as hereinafter fully described.

Reference is to be had to the accompanying drawing, forming part of this specification, in which the figure is a perspective view of my improved grinding apparatus applied to a foot-power machine.

The pulley $a$, having a bearing in the upright $b$, and being driven by a belt, $c$, from a wheel, $d$, to which power may be applied by a treadle, $e$, or any other means, has a long flexible shaft, $f$, of coiled wire, attached to its shaft $g$, and extending back of the upright frame $b$ and returning through a guide and support, $h$, suspended from one end of an adjustable bar, $i$, attached to the top of a bracket, $j$, which is offset backward from the top of frame $b$ a suitable distance to allow the grinding-wheel $j'$ to work on a mower or reaper sickle placed in the clamps $k$, to be held for grinding the cutters thereon. From the guide $h$ the flexible shaft $f$ extends a suitable distance, and is connected at the end with the mandrel $l$ of the wheel or stone $j'$, which has a bearing in the hub $m$ of a bar, $n$, having a handle, $o$, by which to hold the stone or emery-wheel to the work. The bar $i$ is secured to the top of bracket $j$ by a clamp-screw, $p$, which passes through a slot of said bar, allowing the bar to shift lengthwise along the bracket, and also to swing up and down at the ends. At the other end of said bar a socket device, $q$, is suspended from it by an adjusting-screw, $s$, allowing it to be turned on said bar $i$, the said socket device being to receive the bar $n$ to hold the stone in any desired fixed position, and there is also a socket, $t$, in the bracket $j$, for receiving said bar $n$, when it is desired to hold the stone in that position. For a seat to accommodate the operator, and as a means of staying the frame $b$ in an upright position, $u$ is a bench pivoted to the frame at $w$, and above it provided with a pin, $x$, to retain it in position when raised. To this bench are pivoted the legs $v$ $v$. By this construction the bench and legs may be folded down flat against the main frame for storage or transportation.

$y$ represents a drill or carving-tool, attached to the spindle of the grinding-disk, to be used, when required, with or without the disk.

Having thus described my invention, I claim as new and desire to secure by Letters Patent—

1. The combination, in a grinding-machine, of the driving-pulley $a$, flexible shaft $f$, support $h$, connected by suitable means with the main frame $b$, the handle-bar $n$, and the stone or emery-wheel $j'$, having its shaft or spindle bearing in hub $m$ of said bar $n$, substantially as described.

2. The combination, with the main frame $b$, of the adjusting supporting-bar $i$ and shaft-support $h$, the flexible shaft $f$, the driving-pulley $a$, and the handle-bar $n$, substantially as described.

3. The adjusting-bar $i$ and adjusting-socket device $q$, in combination with the main frame $b$, the flexible shaft $f$, driving-pulley $a$, and the handle-bar $n$, substantially as described.

4. The combination, with the main frame $b$, flexible shaft $f$, drive-pulley $a$, and handle-bar $n$, of the adjusting-bar $i$ and adjusting-socket device $q$, substantially as and for the purpose specified.

5. The bracket $j$, having the socket $t$, in combination with flexible shaft $f$, hand-bar $n$, disk $j'$, and the driving-pulley $a$, substantially as described.

6. The combination of bench $u$ $v$, frame $b$, foot-power driving-gear, and the flexible shaft $f$, support $h$, and the handle-bar $n$, substantially as described.

JOHN RENTZ.

Witnesses:
   GOTTLIEB RENTZ,
   GEO. O. S. BERT.